United States Patent [19]

Daehne

[11] Patent Number: 5,538,304
[45] Date of Patent: Jul. 23, 1996

[54] PNEUMATIC DEVICES

[75] Inventor: John F. Daehne, Watford, England

[73] Assignee: Eastman Kodak Company, Rochester, N.Y.

[21] Appl. No.: 384,889

[22] Filed: Feb. 7, 1995

[30] Foreign Application Priority Data

Feb. 25, 1994 [GB] United Kingdom .................... 9403626

[51] Int. Cl.$^6$ ..................................................... B66C 1/54
[52] U.S. Cl. ............................ 294/93; 294/88; 294/119.1
[58] Field of Search .............................. 294/86.4, 88, 93, 294/94, 98.1, 99.1, 119.1, 119.3, 902; 901/37, 39

[56] References Cited

U.S. PATENT DOCUMENTS

| | | | |
|---|---|---|---|
| 2,826,445 | 3/1958 | Tidland | 294/93 |
| 3,880,294 | 4/1975 | Arseneault | 214/1B |
| 4,114,909 | 9/1978 | Taitel et al. | 279/1 Q |
| 4,173,368 | 11/1979 | Haverbusch | 294/88 |
| 4,245,861 | 1/1981 | Harry et al. | 294/94 |
| 4,955,655 | 9/1990 | Caracciolo, Jr. et al. | 294/93 |
| 5,011,207 | 4/1991 | Stevens | 294/119.1 |

FOREIGN PATENT DOCUMENTS

| | | | |
|---|---|---|---|
| 3405743A1 | 10/1984 | Germany . | |
| 3420860 | 12/1985 | Germany | 294/93 |
| 1442397 | 12/1988 | U.S.S.R. | 294/902 |
| 2008991 | 12/1978 | United Kingdom . | |
| 2034276 | 6/1980 | United Kingdom . | |

Primary Examiner—Dean Kramer
Attorney, Agent, or Firm—Charles E. Snee, III; Mark G. Bocchetti

[57] ABSTRACT

It is well known to use pneumatically-operated devices for handling containers, such as, gripping finger mechanisms and suction devices. However, the former type of mechanism can be unstable and the contents of the container can easily be spilled as the container is moved from one location to another. In the latter type, the top of the container needs to be undamaged to ensure proper engagement. Described herein is an improved pneumatically-operated device in which a plurality of pistons (22, 24, 26, 28, 30) are housed in a body portion (10), the pistons (22, 24, 26, 28, 30) being operated by an air supply to move a split ring (40) into and out of engagement with a container to move it from one location to another.

5 Claims, 2 Drawing Sheets

PNEUMATIC DEVICES

FIELD OF THE INVENTION

This invention relates to pneumatic devices and is more particularly, although not exclusively, concerned with the use of such devices for the handling of photographic emulsions and test samples.

BACKGROUND OF THE INVENTION

It is known to use mechanical grippers in the shape of fingers for handling containers of photographic emulsions and test samples. Suction devices are also known for handling these materials. Both the mechanical grippers and the suction devices may be pneumatically operated, and as a result, containers containing photographic emulsions and test samples are handled by engagement of the container by these pneumatically-operated devices.

Mechanical grippers in the form of fingers form part of a complicated mechanism which normally only grips a container at a single point. This means that the container may be unbalanced as it is moved from one position to another and its contents may be spilled unless care is taken during handling.

Suction devices handle containers by engaging the inner surface of an upper portion of the container. However, these devices will not hold containers which have been damaged at their upper portion. Furthermore, the reduction in pressure required to operate these devices can affect the contents of the container.

SUMMARY OF THE INVENTION

It is an object of the present invention to provide an improved pneumatically-operated device for handling containers which overcomes the problems associated with the prior art.

In accordance with one aspect of the present invention, there is provided a device for handling containers comprising:

a body portion having a fluid inlet formed therein; a movable portion operable for moving between a first position and a second position, contact being made with a container in the second position;

operating means mounted in the body portion and connectable to the movable portion; and connecting means connecting the fluid inlet with the operating means whereby connection of the fluid inlet with an external fluid supply operates the operating means to effect movement of the movable portion between the first and second position.

Advantageously, the movable portion comprises a split ring which is expanded by the operating means. The connecting means may comprise a plurality of tubular bore elements formed in the body portion, each bore element comprising a fluid passageway portion and a piston chamber portion.

Preferably, the operating means comprises a plurality of piston elements mounted in respective ones of piston chamber portions.

The device according to the present invention is simply worked from a single controlled fluid supply and will be able to handle containers which are out of round or have damaged lips.

Furthermore, the device is small and light, and its dimensions can easily be changed to allow for the handling of different containers.

BRIEF DESCRIPTION OF THE DRAWINGS

For a better understanding of the present invention, reference will now be made, by way of example only, to the accompanying drawings in which.

DETAILED DESCRIPTION OF THE INVENTION

The device in accordance with the present invention forms an attachment which fits on to the arm of a robot-type manipulating and positioning machine. The purpose of the device is to grip polished, smooth-sided stainless steel containers so that they can be lifted and moved accurately either at will or under computer control.

The device is disc-shaped to fit into a container, and comprises a series of internal pistons which can be moved in and out under air pressure which bear against the back of a split expanding ring. The expanding ring has a compliant surface which can be forced by the pistons against the inner surface of the container which is to be handled.

When air pressure is applied to the device, the pistons are forced outwards pushing the expanding ring against the inner surface of the container.

When the air pressure is released, the pistons and expanding ring contract, releasing the container and the positioning device is then free to move another container.

Figure 1:
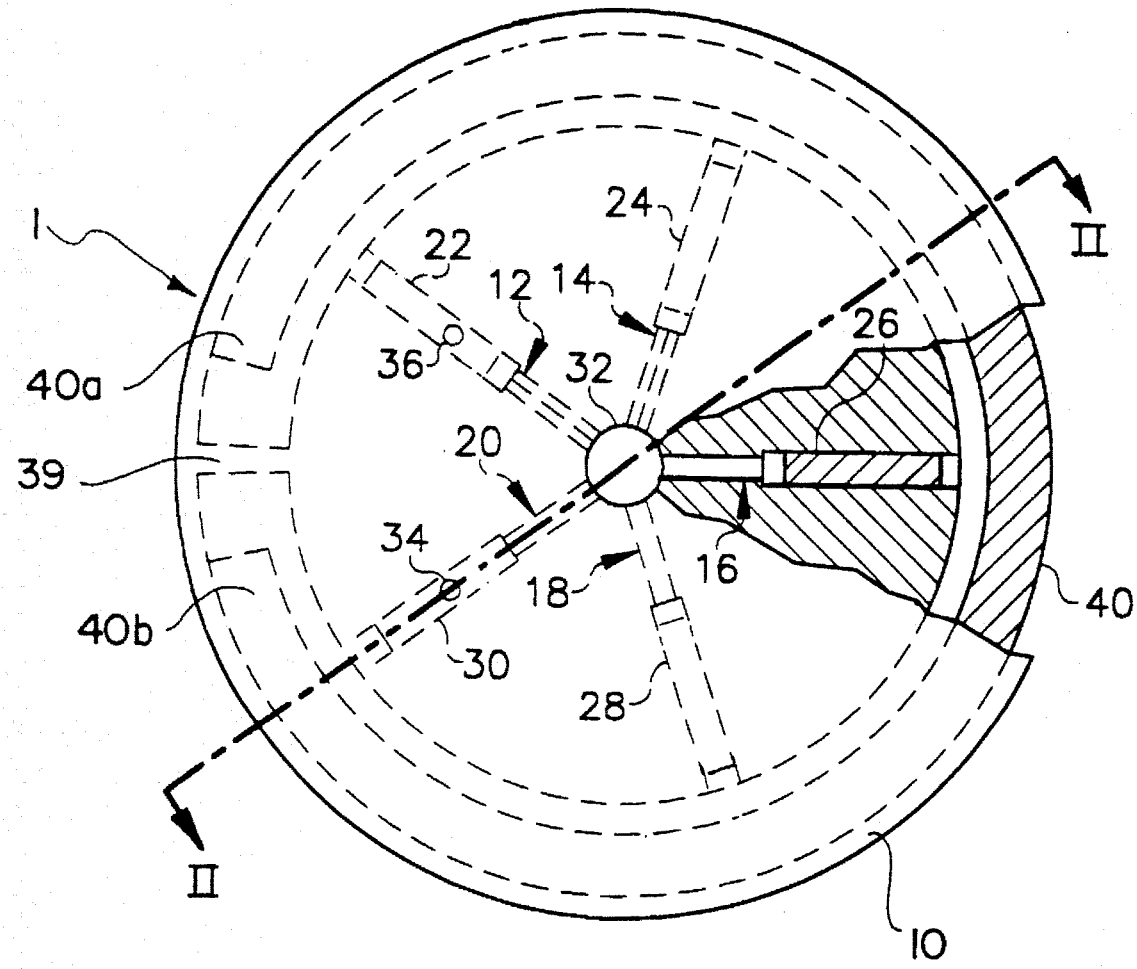
FIG. 1 is a partly sectioned plan view of a device constructed in accordance with the present invention.
Figure 2:
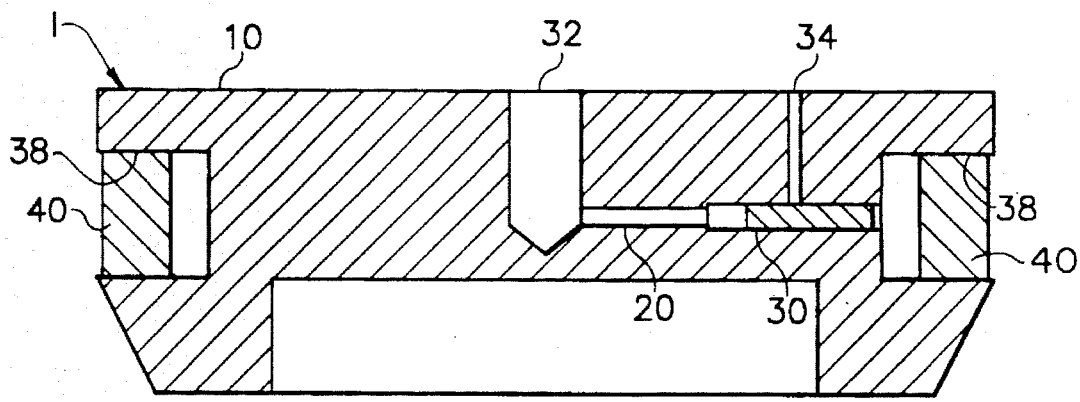
FIG. 2 is a sectioned view taken on lines II—II of FIG. 1.

In FIGS. 1 and 2, the device 1 of the present invention is shown in detail. The device 1 comprises a substantially circular body portion 10 having five tubular bores 12, 14, 16, 18, 20 which extend radially outwardly from, and are fluidly connected to, a central air inlet 32. The central air inlet 32 is connected to an air supply (not shown).

Each bore 12, 14, 16, 18, 20 comprises an airway portion and a piston chamber portion (not shown in detail) which has a respective piston 22, 24, 26, 28, 30 located therein. Each piston 22, 24, 26, 28, 30 is free to move within its associated chamber portion, and movement within that chamber is activated in response to air entering its associated tubular bore 12, 14, 16, 18, 20 from the air supply. Two of the tubular bores 12, 20 each includes a respective vent hole 34, 36 which has been drilled into the appropriate piston chamber portion.

An annular groove 38 is formed in the body portion 10 as is shown more clearly in FIG. 2. An expanding ring 40 is positioned in the annular groove 38 and is operated by the pistons 22, 24, 26, 28, 30 to move it into and out of contact with a container (not shown).

When air pressure is applied to the device 1 through central inlet 32, the pistons 22, 24, 26, 28, 30 move radially outwardly away from the inlet 12 and force the expanding ring 40 in groove 38 outwardly so that it projects beyond the body portion 10.

An air pressure of approximately 55.12 MPa is suitable for operation of this device. However, it will readily be understood that the air pressure can be adjusted according to the particular application.

Figure 3:
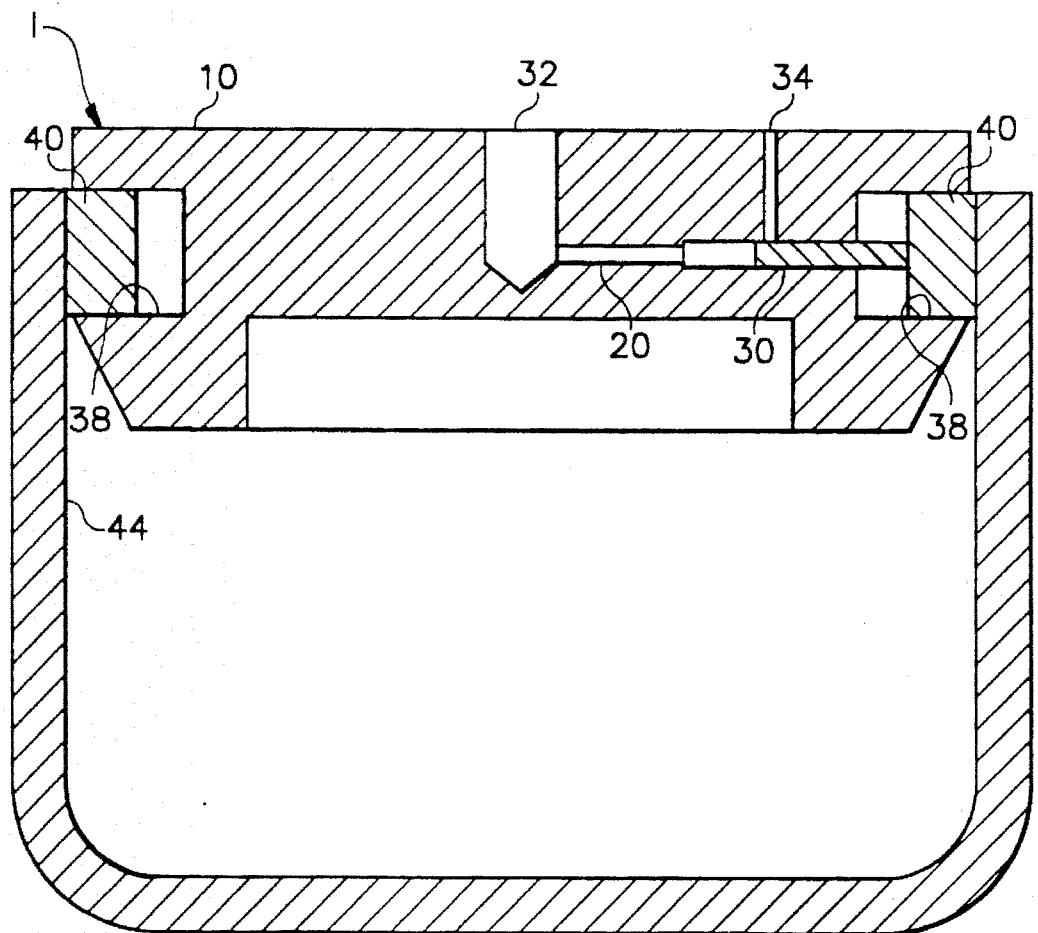
FIG. 3 is similar to FIG. 2, but illustrating engagement of the device with a container.

FIG. 3 illustrates the device 1 positioned in the top of a container 42 with the expanding ring 40 pressing against an inner wall 44 of a container 42. As shown here, piston 30 has been advanced by the air pressure applied to the central inlet 32, pushing the expanding ring 40 against inner wall 44 of the container 42. Likewise, the other pistons 22, 24, 26, 28 have advanced in similar manner pushing the expanding ring 40 against the wall 44. Once all the pistons 22, 24, 26, 28, 30 have been extended in their respective tubular bores 12, 14, 16, 18, 20, to expand ring 40, the container 42 is held securely and can be lifted and moved around. By releasing the air pressure, the container 42 can be left in any desired position.

Normally, each piston 22, 24, 26, 28, 30 is restrained by the container 42 when air is applied to the inlet 32. However, if the air is applied whilst the device 1 is not in a container, the two vent holes 34, 36 provided in piston chamber portions of tubular bores 12, 20 described above, will allow the respective pistons 22, 30 to advance until the two vent holes 34, 36 are exposed. Once exposed, air applied to the device 1 will simply escape through the holes 34, 36 to limit any further movement of the pistons and the expanding ring 40. The vent holes 34, 36 prevent over-expansion of the expanding ring 40, and possible damage to the device 1.

The vent holes 34, 36 are provided in the piston chamber portions of tubular bores 12, 20 as they are located near the free ends 40a, 40b of the expanding ring 40. This is because the ring 40 tends to expand outwardly first at the free ends as the air pressure is applied. The vent holes 34, 36 are positioned in the associated piston chamber portion at a point which is normally radially inwardly of the full stroke of the associated piston 22, 30 in its piston chamber portion.

The expanding ring 40 is made of a hard springy plastic material which allows the ring 40 to slide within the groove 38 and to grip the wall 44 of container 42. As shown in FIG. 1, the ring 40 is split to allow expansion. A radial abutment 39 in groove 38 prevents ring 40 from rotating very far from its illustrated position, thus ensuring that free ends 40a, 40b remain adjacent vent holes 34, 36.

The ring 40 may be made of PVC or other similar material which is coated on its outermost surface (that is, the surface which will contact the container) with a layer of a 'Neoprene' (Registered Trade Mark) foam material or other rubberized foam material.

Naturally, any other suitable material may be used which has a high coefficient of friction and which is sufficiently flexible to blend to the contours of the container to provide the required engagement between the expanding ring 40 and the container being handled.

Alternatively, the ring 40 need not be coated entirely with a foam material as described above. Cut-outs may be formed in the outermost surface of the ring which are filled with inserts of a suitable material to provide localized areas which provide the engagement between container and device in the areas of the pistons.

Different piston arrangements may be utilized according to size and application.

Although the device in accordance with the present invention is described as a pneumatic device, other suitable operating fluids can be used.

| Parts List |
|---|
| 1...device of invention |
| 10...circular body portion |
| 12, 14, 16, 18, 20...tubular bores |
| 22, 24, 26, 28, 30...pistons |
| 32...central air inlet |
| 34, 36...vent holes |
| 38...annular groove |
| 39...radial abutment in groove 38 |
| 40...expanding ring |
| 40a, 40b...free ends of ring 40 |
| 42...container |
| 44...inner wall |

What is claimed is:

1. A device for handling containers comprising:

a body portion having a fluid inlet formed therein;

a movable portion operable for moving between a first position and a second position, contact being made with a container in the second position, the movable portion comprising a split ring;

operating means mounted in the body portion and connectable to the split ring; and connecting means connecting the fluid inlet with the operating means whereby connection of the fluid inlet with an external fluid supply operates the operating means to effect movement of the split ring between the first position and the second position by expansion thereof.

2. A device according to claim 1, wherein the connecting means (12, 14, 16, 18, 20) comprises a plurality of tubular bore elements formed in the body portion (10), each bore element comprising a fluid passageway portion and a piston chamber portion.

3. A device according to claim 2, wherein the operating means (22, 24, 26, 28, 30) comprises a plurality of piston elements mounted in respective ones of piston chamber portions.

4. A device according to claim 2, wherein at least one of the piston chamber portions includes a vent hole to limit movement of the split ring.

5. A device for handling containers comprising:

a body portion having a fluid inlet formed therein;

a split ring operable for moving between a first position and a second position, contact being made with a container in the second position;

operating means mounted in the body portion and connectable to the split ring; and connecting means connecting the fluid inlet with the operating means, the connecting means comprising a plurality of tubular bore elements formed in the body portion, each bore element comprising a fluid passageway portion and a piston chamber portion, whereby connection of the fluid inlet with an external fluid supply operates the operating means to effect movement of the split ring between the first position and the second position by expansion thereof, at least one of the piston chamber portions including a vent hole to limit the movement of the split ring.

* * * * *